United States Patent
Galindo-Legaria et al.

(10) Patent No.: US 6,510,422 B1
(45) Date of Patent: Jan. 21, 2003

(54) COST BASED MATERIALIZED VIEW SELECTION FOR QUERY OPTIMIZATION

(75) Inventors: Cesar A. Galindo-Legaria, Redmond, WA (US); Milind M. Joshi, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 201 days.

(21) Appl. No.: 09/671,458

(22) Filed: Sep. 27, 2000

(51) Int. Cl.$^7$ .............................................. G06F 17/30
(52) U.S. Cl. ........................................ 707/2; 707/102
(58) Field of Search ................................ 707/2, 3, 102

(56) References Cited

U.S. PATENT DOCUMENTS 5,897,632 A * 4/1999 Dar et al. ...................... 707/2
6,275,818 B1 * 8/2001 Subramanian et al. ......... 707/2

OTHER PUBLICATIONS de Aguiar Ciferri, C.D.; de Fonseca de Souza, F. discloses Materialized views in data warehousing environments Computer Science Society, 2001. SCCC '01. Proceedings. XXI International Conference of the Chilean, 2001 pp.: 3–12.*

Moro, G.; Sartori, C. discloses incremental maintenance of multi-source views in Database Conference, 2001. ADC 2001. Proceedings. 12th Australasian, 2001 pp.: 13–20.*

* cited by examiner

Primary Examiner—Diane D. Mizrahi
(74) Attorney, Agent, or Firm—Woodcock Washburn LLP

(57) ABSTRACT

A query optimizer determines the applicability of materialized views to a query. View utilization alternatives are generated in the exploration stage of optimization, so that interaction with other transformations in complex queries is taken into account. A final decision on whether to use a materialized view is based on estimated cost. The optimizer generates a table of alternatives, which compactly encodes the various possibilities for each sub-expression of the query. Optimal-cost operator trees are extracted from this table. Materialized views are detected and substituted during exploration of the various possibilities and added to the table of alternatives. Materialized views and the alternatives are selected for use in a query execution plan based on cost. When two operator trees are not identical, a residual operator can be used if one operator tree subsumes the other operator tree. The residual expression can contain operators such as filters, group by and join.

41 Claims, 4 Drawing Sheets

COST BASED MATERIALIZED VIEW SELECTION FOR QUERY OPTIMIZATION

FIELD OF THE INVENTION

This invention relates generally to the field of computers, and in particular to a database query optimizer that selects materialized views on a cost basis.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 2000, Microsoft Corporation, All Rights Reserved.

BACKGROUND

Relational databases are collections of rows or tuples of data. Each row may have one or more columns containing information, such as numbers, names, addresses, etc. For example, a column might contain the names of employees, employee ID, address, phone, sales for each day, and other information. This information is stored in a table in the database. All the information in a row in this particular table is related to the same person. A query can be written, requesting information from the table. One such query might be related to sales. The query could be related to finding the sales for each employee on a certain day.

Materialized views have been a subject of database research for over a decade. The basic idea is to materialize, or store, the result of some query, then use such computed result when similar queries are submitted to the database. For example, we may want to store the result of, say, sales per day, and use the stored results to answer several related queries, including sales in a given month, or total sales in the year.

For maximum flexibility, applications should not need to be aware that certain views exist, or are materialized. A query processor should identify matches between user queries and existing pre-computed results, and use such results when applicable. This is known as the view utilization problem: Given a user query written over base tables, as well as a collection of materialized views, which materialized views can be used to answer such query? One must then determine which of the views should be used.

To guarantee transactional correctness, the contents of a view must be kept in synch with respect to changes in base tables. For example, when orders are entered, or modified, the materialization of sales per week has to be updated to reflect the changes. This is known as the view maintenance problem.

Materialized views are similar to indices, in that they should be part of the physical design of the database and their primary purpose is to improve performance. The logical design of the database, and correctness of applications should be independent of the presence or absence of materialized views. As with indices, materialized views can introduce dramatic improvements in query performance.

Prior attempts to determine which views should be used treat the problem in isolation, handle limited scenarios, and often assume a "global" structure that covers the whole query. This is useful in providing "coverage results," e.g. given a view with this set of predicates and a query of this form, use this algorithm to decide if the view can be used to answer the query. There is a need to deal with arbitrary queries, and to integrate view utilization within the actual architecture of query optimizers. There is a further need to address the question of, once you know the view can be used to answer the query, should it be used.

Constructing a "global" structure for the user query, for the purpose of view matching, is incompatible with common optimizer architecture, and it is sometimes impossible, when a "disallowed" construct is used. On some complex queries, view utilization will be possible only in sub-expressions of the complete query. Furthermore, those sub-queries may appear only after some reordering has taken place, which is naturally done in the process of exploration of alternatives.

SUMMARY OF THE INVENTION

A cost based query optimizer determines the applicability of materialized views to a query. View utilization alternatives are generated in the exploration stage of optimization, so that interaction with other transformations in complex queries is taken into account. A final decision on whether to use a materialized view is based on estimated cost.

The optimizer generates a table of alternatives, which compactly encodes the various possibilities for each sub-expression of the query. Operator trees are implicitly represented in the table. Materialized views are detected and substituted during exploration of the various possibilities and added to the table of alternatives. Materialized views and the alternatives are selected for use in a query execution plan based on cost.

The optimizer is used to estimate cost, prune out expensive solutions, assemble operator trees and construct an optimal solution. For a given query, there are a general number of candidate views as well as a number of table entries on which utilization of the views can be considered. Information, such as the tables referenced in the query, or whether or not the query contains aggregations are used to determine views that could be relevant.

To reduce the number of operator trees considered, collapsed operator trees are generated to form query graphs that basically list all underlying tables along with the predicates that are applied on them, called a query graph. A view that matches a query graph is added to the table of alternatives. A primitive graph tree is also extracted from the table of alternatives. Such a primitive graph tree allows only a specific set of operators, and only allows primitive tables. This allows view tables to be ignored in favor of primitive database tables.

Two operator trees need not be identical. A residual operator can be used if one operator tree subsumes the other operator tree. The residual expression can contain filters, group by and join operators.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a description of how potential materialized views are identified and added to a table of alternatives for consideration by a query optimizer on a cost basis. A conclusion describes some potential benefits and describes further alternative embodiments.

HARDWARE AND OPERATING ENVIRONMENT

Figure 1:
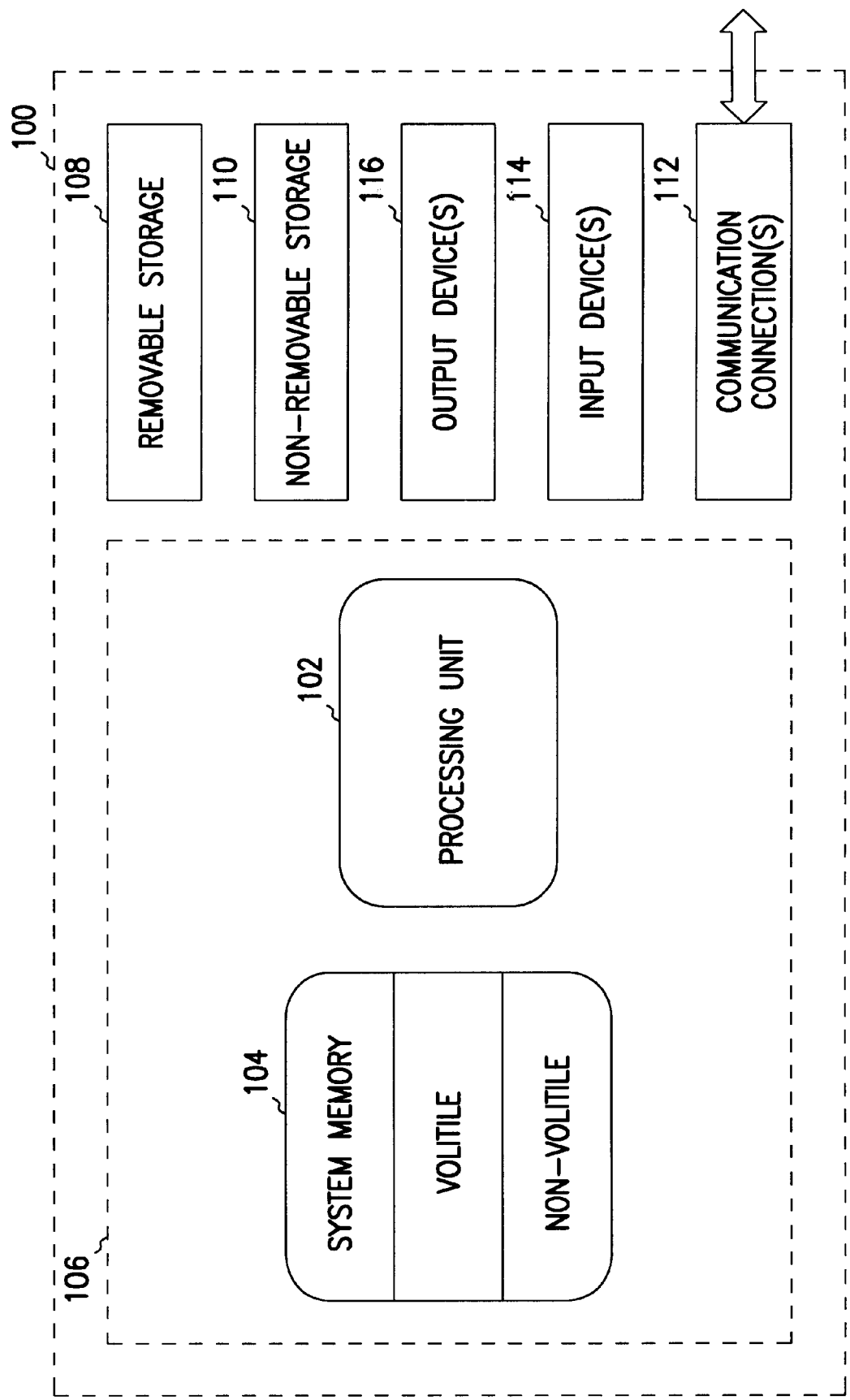
FIG. 1 is a block diagram of a computer system on which the present invention may be implemented.

An exemplary system for implementing the invention includes a computing device, such as computing device 100 in FIG. 1. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by broken line 106.

Device 100 may also include additional features/functionality. For example, device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method of technology for storage of information such as computer readable instructions, data structures, program modules or other data. Memory 104, removable storage 108 and non-removable storage 110 are all examples of computer storage media. Computer storage media includes, but is not limited to RAM, ROM, EEPROM, flash memory or other memory technology, CD-ROM, digital versatile disks (DVD) or other optical storage, magnetic based storage or any other medium which can be used to store desired information and which can be accessed by device 100. Any such computer storage media may be part of device 100.

Device 100 may also contain communications connection(s) 112 that allow the device to communicate with other devices. Communications connection(s) 112 is an example of communication media. Communications media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct-wired connection, and wireless media such as acoustic, RF, infrared and other wireless media. The term computer readable media as used herein includes both storage media and communications media.

Device 100 may also have input device(s) 114 such as keyboard, mouse, pen, voice input device, touch input device, etc. Output device(s) 116 such as display, speakers, printers, etc may also be included. All these devices are well known in the art.

This invention may be described in the context of computer-executable instructions, such as program modules, executed by one or more computer or other devices such as device 110. Generally, program modules include routines, programs, objects, components, data structures, etc. that perform particular tasks go or implement particular abstract data types. Typically the functionality of the program modules may be combined or distributed as desired in various embodiments.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

The invention is described with the use of flowcharts which contain functional blocks. The blocks may be implemented in one or more software or hardware modules as desired, and are performed on computing device 100 in the context of a database system.

IDENTIFYING MATERIALIZED VIEWS

Figure 2:
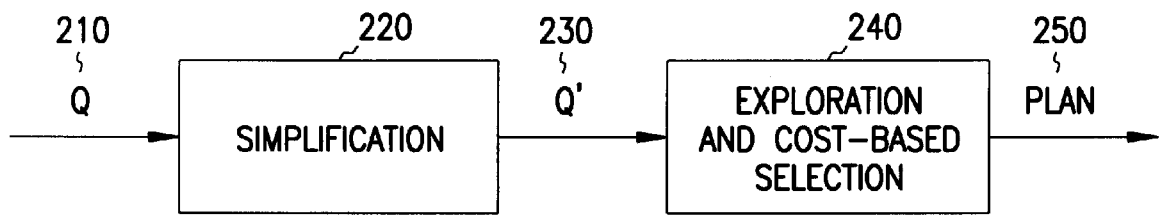
FIG. 2 is a block diagram of a query optimizer in accordance with the present invention.

Query optimizers are normally structured such that there is an initial simplification stage, followed by exploration of alternatives and cost-based selection of an execution plan as illustrated in FIG. 2. The original query is identified at 210. During the simplification/normalization stage 220, some changes are made on the original query, such as pushing selections down, or rewriting a subquery as a join, when possible. These modifications are aimed at obtaining a "better" query 230. Typically, there is no detailed cost estimation at this stage, and a single "better" query 230 is produced as a result, Q' in the above picture.

An exploration stage 240 receives Q' and generates multiple alternatives. The exploration stage 240 also uses a detailed cost model to select the one with cheapest estimated execution cost. The query optimizer provides a plan 250 for executing the query that has the lowest cost.

Two standard architectures for the exploration stage are bottom-up, dynamic programming join enumeration, and transformation-driven generation of alternatives. Both architectures set up a table of alternatives, which compactly encodes the various possibilities for each sub-expression of a query.

It is possible to consider materialized views during query simplification, but this is inadequate because only a single solution can be generated, and there is no detailed cost information to make this choice. Also, it may be that the use of a view is not apparent until some other transformations and modifications of the query have been performed. It is only when the query is very close to the materialized view definition that this is effective—and even then, the original query could be faster than the use of the view, if there is a better set of indices in the base tables, with respect to this particular query.

To solve this problem, view detection and substitution during exploration and cost-based selection are performed. This is described here for a transformation-based optimizer, and the general principles extend to other methods of building the table of alternatives, including bottom-up enumeration.

AUGMENTING THE TABLE OF ALTERNATIVES

Figure 3:
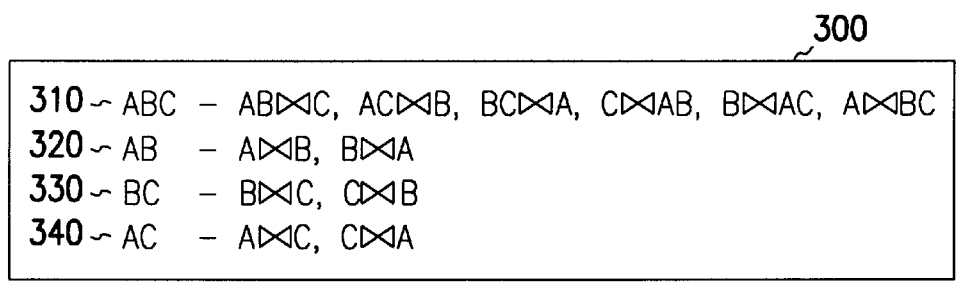
FIG. 3 is a table of alternative entries for consideration during optimization.

Considering materialized views during exploration consists of augmenting the table of alternatives with entries that use such materialized views. Suppose the original query is a join on tables A, B, C. The usual table of alternatives appears as shown generally at 300 in FIG. 3 with only logical operators. The table of alternatives 300 consists of four groups, 310, 320, 330 and 340. Group 310 has a root entry of ABC, and also contains entries with different alternatives. Groups 320, 330 and 340 have root entries of AB, BC and AC respectively. Note that there are only two alternative entries for each, having to do with the order of the join.

Figure 4:
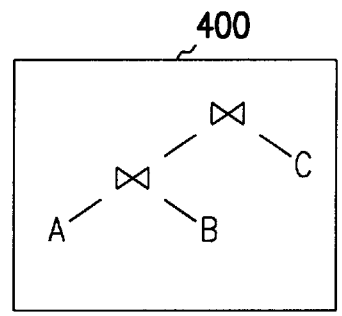
FIG. 4 is a view of an operator tree formed from one entry in the table of FIG. 3.

Encoded operator trees, such as one shown generally at 400 in FIG. 4, are obtained by traversing the table of alternatives. Starting from the root entry (ABC in the query above), an operator is chosen from each entry. The operator tree 400 was formed by taking the first choice in each entry. A and B are first joined, followed by joining the results with C.

Figure 5:
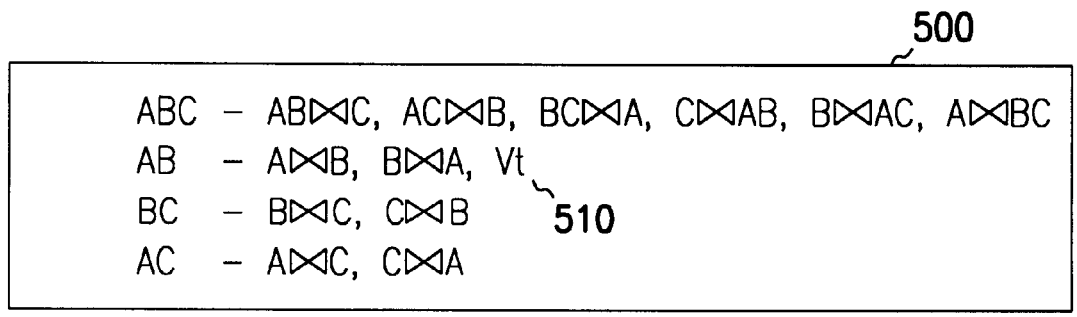
FIG. 5 is an augmented table of alternative entries.

If there is a materialized view V=A join B, there is a stored materialized view table, Vt, which contains the result of the join of A and B. Since this is a valid way to obtain the join sub-expression, the table of alternatives 300 is augmented with this alternative to form an augmented table 500 in FIG. 5. The augmentation is identified at 510, and is added as an entry to the group having root entry AB.

Figure 6:
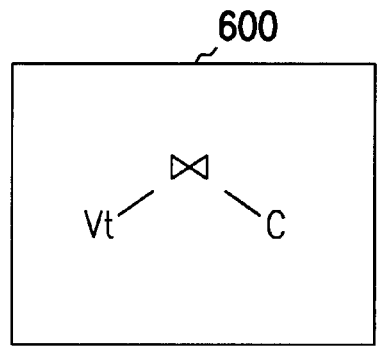
FIG. 6 is an operator tree having a materialized view incorporated therein.

A valid operator tree that can now be generated and is considered by the optimizer is shown in FIG. 6 at 600. It comprises the join of Vt and C. The exact mechanism to augment the table of alternatives depends on the optimizer architecture. In the case of a transformation-based optimizer, the extension is obtained by adding a new transformation rule to the system. For bottom-up join enumeration, a construction procedure needs to be changed. Once the alternative is added to the table, the normal optimizer mechanisms to estimate cost, prune out expensive solution, assemble operator trees, and construct optimal solutions is applied.

For a particular query, there are in general a number of candidate views V1, V2, . . . Vk, as well as a number of table entries on which utilization of views can be considered. Only views that could be relevant for the query need to be considered. Views are identified as not relevant by using information about what database tables are referenced in the query, and whether or not the query contains aggregations. Other information may also be used. This provides the ability to narrow down the set of candidate views. Similar information can be used on each table entry, to avoid trying to match view definitions that can be detected as irrelevant.

To consider multiple pairs of (view, table entry), a table entry is fixed, and then matching is attempted with multiple candidate views. This generates all additional alternatives in a given table entry before moving on. This order is consistent with the normal optimization order, and it also allows generating a single matching structure for each entry and reusing it for each candidate view.

Figure 7:
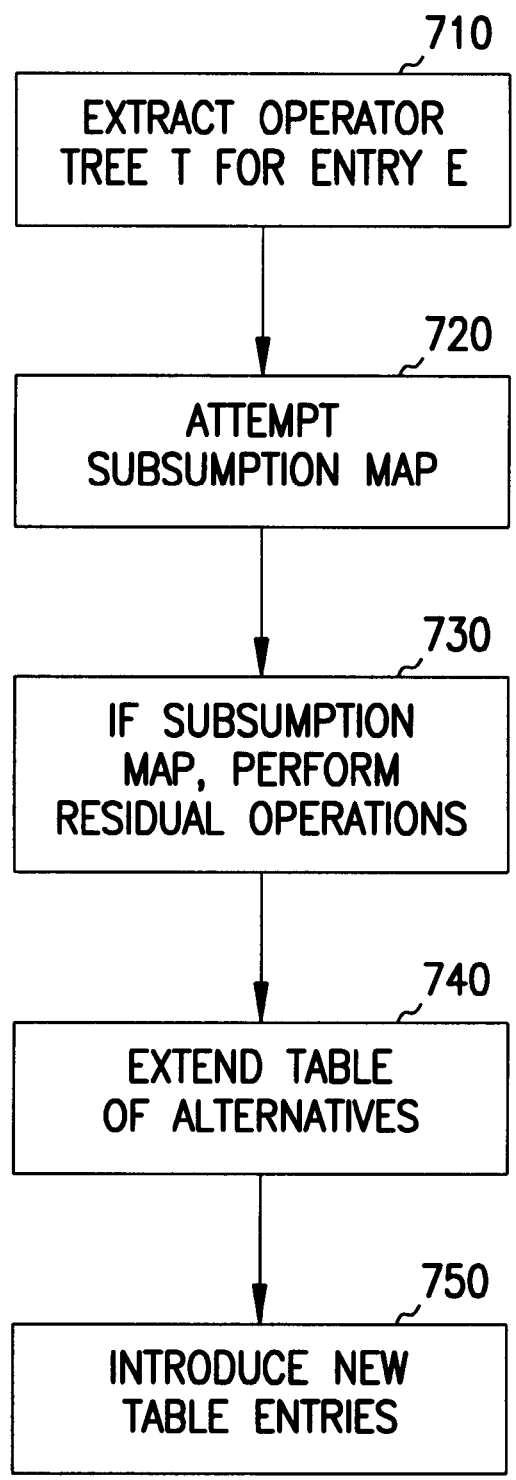
FIG. 7 is a flowchart illustrating the process of identifying views to add to the table of alternative entries.

Given a particular materialized view V, and a particular table entry E where we are to test applicability, the following steps are done as shown in the flowchart of FIG. 7. An operator tree T is extracted for entry E (this step is shared for various views on the same entry E) at 710. Next, a subsumption map is attempted from the view definition V to the operator tree T at 720. Successful mapping produces residual operations, so that T=Op(Vt) at 730. The table of alternatives is extended with the view utilization at 750. Residual operations may require the introduction of new table entries at 740. Further detail of these steps is provided below.

EXTRACTING AN OPERATOR TREE FOR MATCHING

A table entry corresponds to a large number of operator trees. Extracting and considering each operator tree encoded from a given entry is unfeasible as the number of them increases exponentially (on the tables involved). Extracting a single operator tree non-deterministically is inadequate, since it may happen not to match the view definition, yet some other encoded operator tree could match the definition.

An example of this problem is a view definition of the form A join B, when considered on a group that encodes both A join B and B join A. Strict operator mapping would succeed only on one of the two encoded trees. Alternatively, extracting all operator trees quickly becomes unfeasible: For 2 tables, there are 2 operator trees; for 3 tables there are 12; for 4 tables there are already 120 operator trees.

Complementary techniques are used to address this issue. In the first technique, matching is not done on operator trees containing binary joins, but on the collapsed form of those operators known as a query graph, which basically lists all underlying tables, along with the predicates that are applied on them. Once an operator tree is extracted, joins are collapsed, and then the query graphs are compared. This way, extracting either operator tree A join B or B join A yields the same result: A match with materialized view A join B. Query graphs are known to be able to represent at least joins and outerjoins.

In the second technique, a primitive graph-tree is extracted from the table of alternatives for matching with a view. This tree allows only a specific set of operators to appear. For join-graph, only join and filter operators are allowed in the extracted tree. It is possible for some filter conditions to be turned into semijoins, when the conditions is an IN list with a long list of values—but the expression containing semijoin would not map directly into a query graph, yet the expression with the filter would. Thus, it is the filter tree, not the semijoin tree that is desired. Similarly, OR conditions are sometimes turned into UNION. In a join-graph extraction, only joins are considered valid operators when assembling an operator tree for the table entry.

The graph-tree also allows only primitive tables to appear. Table entries may already contain references to views, but they should be excluded for assembly of a tree of a particular entry. For the join of three tables considered earlier, extracting operator tree Vt join C will not match a view whose definition is A join B join C. View tables are therefore ignored, in favor of primitive database tables.

As mentioned earlier, the operator tree with a desirable form is extracted and its query graph is constructed only once, for a given table entry. The resulting query graph is then reused to match multiple candidate views.

In one embodiment, two broad classes of expressions are considered: Either a graph-tree, or else a Group By above a graph-tree. Other classes may be considered in further embodiments. For a particular table entry, an attempt is made to extract two trees, for the two classes of views.

SUBSUMPTION MAPPING

Figure 8:
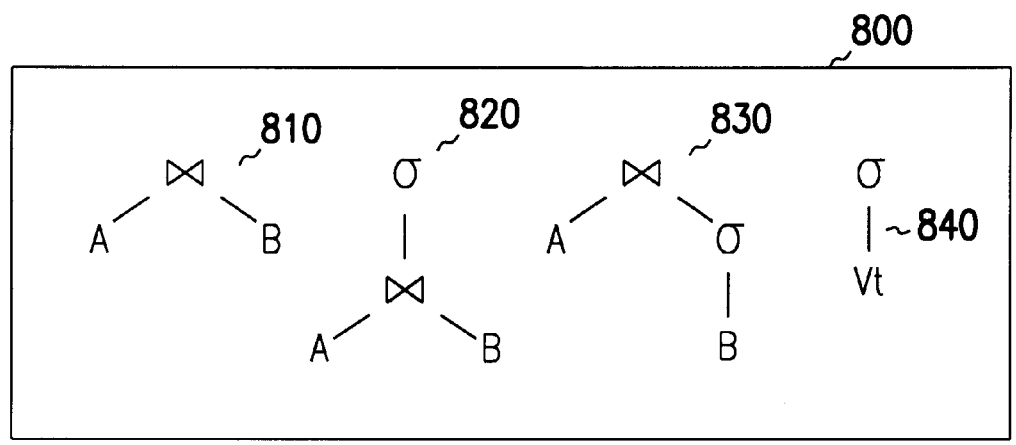
FIG. 8 is a view of multiple alternative operator trees, including a residual operator tree.

When comparing the view definition with the extracted tree, a mapping is set up between table references, predicates, and other scalar expressions between the two. But the two expressions need not be, and often are not, identical. The reason is that the normal process of exploration does not consider all possible equivalent operator trees for a query. For example, three operator trees, 810, 820 and 830 are shown in FIG. 8. The first operator tree 810 is a view definition; the second operator tree 820 is a query where the view would match directly on a sub-tree. However, this second operator tree 820 would never be considered in the normal search space of the optimizer, which only considers early evaluation of select (because there is no use in their late evaluation). The view then has to be matched with the third operator tree 830, which is not identical.

This "non-exact" matching is the result of restrictions on the search space of the optimizer, and the degree of similarity to be handled needs to consider the search space implemented by the optimizer. The difference leads to the need of residual operators. In the case above, matching of the view generates a residual operator tree 840. A residual expression can contain filters, as shown in the case above, GroupBy, and joins. GroupBy is used when a "higher-granularity" aggregate is used to compute "lower-granularity." For example, an existing materialized view that computes total sales by (region, month) can be used to compute total sales by region (over all months).

Joins are used, for example to obtain more columns. Say a materialized view contains the result of multiple joins, and it stores a customer key, but not the name. In a query that requires the name also, the view can be used, but the residual operation contains an additional join with the customer table, to retrieve the name from the known key.

The derivation of some specific residual operators for joins or aggregations is known to those skilled in the art. It is also known that a materialized view of the form, say A join B join C can be used to answer a query with a single join A join B, provided there is a foreign key constraint between B and C (or between A and C). Those techniques can be utilized and leveraged by the present invention. In fact, this is the point where the optimizer-wide mechanism links into existing results on whether a view of a particular form can be used to answer some query.

EXTEND THE TABLE OF ALTERNATIVES

Once a materialized view alternative has been found (view reference plus perhaps residual operators), it has to be added to the table of alternatives. In the context of a transformation-based optimizer such as the one used by SQL Server, this is handled by the optimizer framework, which takes the expression and adds the root operator to the original table entry considered, creating new table entries if needed. In a bottom-up enumeration approach, there is no generic, standard mechanism to append alternatives to a table entry, so it needs to be coded taking into account existing utilities and other implementation details of the system.

In one embodiment, the following modifications or additions are made to the transformation-based optimizer of a database server in accordance with the above description:

Adding a CGraph primitive to the structures used to describe patterns for transformation rules.

Adding two transformation rules, one that deals with materialized views of the form graph-tree, another to deal with materialized views of the form Group By over graph-tree.

Adding function to take an operator tree with binary joins, and generate query graphs.

Adding function to perform subsumption matching of two query graphs, with generation of residual operators when matching is successful.

Adding function to perform column mapping, for smooth integration of a new table that is producing columns that used to be generated differently.

CONCLUSION

This application is intended to cover any adaptations or variations of the present invention. It is manifestly intended that this invention be limited only by the claims and equivalents thereof. A system and method have been described that enable the applicability of materialized views to a query to be determined by a cost-based query optimizer. View utilization alternatives are generated in the exploration stage of optimization, so that interaction with other transformations in complex queries is taken into account. A final decision on whether to use a materialized view is based on estimated cost.

We claim:

1. A method of selecting materialized views for use in execution of a database query, the method comprising:

obtaining a table of alternatives having multiple entries for execution of the query;

selecting relevant materialized views for the query;

for each entry and view:

extracting an operator tree for the entry and the view;

matching operator trees for entries and views; and if a match is found, extending the table of alternatives with the view.

2. The method of claim 1 wherein extracting an operator tree for an entry containing binary joins comprises collapsing operators into a query graph.

3. The method of claim 2 wherein the collapsing of the operators into a query graph comprises listing underlying tables along with predicates that are applied on them.

4. The method of claim 1 wherein extracting an operator tree for a view comprises collapsing operators into a primitive graph-tree.

5. The method of claim 4 wherein a primitive graph-tree is restricted to a specific set of operators and is restricted to primitive tables.

6. The method of claim 5 wherein only join, outerjoins and filter operators are allowed in the operator tree for join graphs.

7. The method of claim 1 wherein the table of alternatives is extended by adding a root operator.

8. The method of claim 1 and further comprising:
using a cost based optimizer to select an execution plan based on the augmented table of alternatives.

9. A machine readable medium having instructions for causing a computer to perform a method of selecting materialized views for use in execution of a database query, the method comprising:
obtaining a table of alternatives having multiple entries for execution of the query;
selecting relevant materialized views for the query;
for each entry and view:
extracting an operator tree for the entry and the view;
matching operator trees for entries and views; and
if a match is found, extending the table of alternatives with the view.

10. The machine readable medium of claim 9 wherein extracting an operator tree for an entry containing binary joins comprises collapsing operators into a query graph.

11. The machine readable medium of claim 10 wherein the collapsing of the operators into a query graph comprises listing underlying tables along with predicates that are applied on them.

12. The machine readable medium of claim 9 wherein extracting an operator tree for a view comprises collapsing operators into a primitive graph-tree.

13. The machine readable medium of claim 12 wherein a primitive graph-tree is restricted to a specific set of operators and is restricted to primitive tables.

14. The machine readable medium of claim 13 wherein only join, outerjoin and filter operators are allowed in the operator tree for join graphs.

15. The machine readable medium of claim 9 wherein the table of alternatives is extended by adding a root operator.

16. The machine readable medium of claim 9 and further comprising:
using a cost based optimizer to select an execution plan based on the augmented table of alternatives.

17. A query optimizer that selects materialized views for use in execution of a database query, the query optimizer comprising:
means for obtaining a table of alternatives having multiple entries for execution of the query;
means for selecting relevant materialized views for the query;
for each entry and view:
means for extracting an operator tree for the entry and the view;
means for matching operator trees for entries and views; and
if a match is found, extending the table of alternatives with the view.

18. The query optimizer of claim 17 wherein means for extracting an operator tree for an entry containing binary joins and outerjoins comprises means for collapsing operators into a query graph.

19. The query optimizer of claim 18 wherein means for collapsing of the operators into a query graph comprises means for listing underlying tables along with predicates that are applied on them.

20. The query optimizer of claim 17 wherein means for extracting an operator tree for a view comprises means for collapsing operators into a primitive graph-tree.

21. The query optimizer of claim 20 wherein a primitive graph-tree is restricted to a specific set of operators and is restricted to primitive tables.

22. The query optimizer of claim 21 wherein only join, outerjoins and filter operators are allowed in the operator tree for join graphs.

23. The query optimizer of claim 17 wherein the table of alternatives is extended by adding a root operator.

24. The query optimizer of claim 17 and further comprising:
means for selecting an execution plan based on the augmented table of alternatives using a cost based optimizer.

25. A method of selecting materialized views for use in execution of a database query, the method comprising:
obtaining a table of alternatives for execution of the query;
augmenting the table of alternatives with selected materialized views; and
using a cost based optimizer to select an execution plan based on the augmented table of alternatives.

26. A computer readable medium having instructions to perform a method of selecting materialized views for use in execution of a database query, the method comprising:
obtaining a table of alternatives for execution of the query;
augmenting the table of alternatives with selected materialized views; and
using a cost based optimizer to select an execution plan based on the augmented table of alternatives.

27. A method of selecting materialized views for use in execution of a database query, the method comprising:
obtaining a table of alternative entries for execution of the query;
selecting relevant views for the query;
matching relevant views with each entry;
augmenting the table of alternative entries with select matching materialized views; and
using a cost based optimizer to select an execution plan based on the augmented table of alternatives.

28. A method of selecting materialized views for use in execution of a database query, the method comprising:
obtaining a table of alternatives having multiple entries for execution of the query;
selecting relevant materialized views for the query;
for each entry and view:
extracting an operator tree for the entry and the view;
attempting a subsumption map from a definition of the materialized view to the operator tree;
matching operator trees for entries and views; and
if a match is found, extending the table of alternatives with the view.

29. The method of claim 28 wherein if the subsumption map attempt is successful, defining residual operations.

30. The method of claim 29 and further comprising adding defined residual operations to the table of alternatives.

31. The method of claim 30 wherein the residual operations are selected from the group consisting of filters, group by and joins.

32. The method of claim 28 wherein extracting an operator tree for an entry containing binary joins comprises collapsing operators into a query graph.

33. The method of claim 32 wherein the collapsing of the operators into a query graph comprises listing underlying tables along with predicates that are applied on them.

34. The method of claim 28 wherein extracting an operator tree for a view comprises collapsing operators into a primitive graph-tree.

35. The method of claim 34 wherein a primitive graph-tree is restricted to a specific set of operators and is restricted to primitive tables.

36. The method of claim 35 wherein only join and filter operators are allowed in the operator tree for join graphs.

37. The method of claim 28 wherein the table of alternatives is extended by adding a root operator.

38. The method of claim 28 and further comprising:
    using a cost based optimizer to select an execution plan based on the augmented table of alternatives.

39. A computer readable medium having instructions for causing a computer to perform a method of selecting materialized views for use in execution of a database query, the method comprising:
    obtaining a table of alternatives having multiple entries for execution of the query;
    selecting relevant materialized views for the query;
    for each entry and view:
       extracting an operator tree for the entry and the view;
       attempting a subsumption map from a definition of the materialized view to the operator tree;
       matching operator trees for entries and views; and
    if a match is found, extending the table of alternatives with the view.

40. A method of selecting materialized views for use in execution of a database query, the method comprising:
    obtaining a table of alternatives having multiple entries for execution of the query;
    selecting relevant materialized views for the query;
    for each entry and view:
       extracting an operator tree for the entry by collapsing operators into a query graph
       extracting an operator tree for the view by collapsing operators into a query graph;
       attempting a subsumption map from a definition of the materialized view to the operator tree;
       if the subsumption map attempt is successful, defining residual
       operations;
       matching operator trees for entries and views;
    if a match is found, extending the table of alternatives with the view by adding a root operator; and
    using a cost based optimizer to select an execution plan based on the augmented table of alternatives.

41. A computer readable medium having instructions for causing a computer to perform a method of selecting materialized views for use in execution of a database query, the method comprising:
    obtaining a table of alternatives having multiple entries for execution of the query;
    selecting relevant materialized views for the query;
    for each entry and view:
       extracting an operator tree for the entry by collapsing operators into a query graph
       extracting an operator tree for the view by collapsing operators into a query graph;
       attempting a subsumption map from a definition of the materialized view to the operator tree;
       if the subsumption map attempt is successful, defining residual operations;
       matching operator trees for entries and views;
    if a match is found, extending the table of alternatives with the view by adding a root operator; and
    using a cost based optimizer to select an execution plan based on the augmented table of alternatives.

* * * * *